US008064080B2

(12) United States Patent
Kawai

(10) Patent No.: US 8,064,080 B2
(45) Date of Patent: Nov. 22, 2011

(54) CONTROL OF DATA DISTRIBUTION APPARATUS AND DATA DISTRIBUTION SYSTEM

(75) Inventor: Tomoaki Kawai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1107 days.

(21) Appl. No.: 11/271,655

(22) Filed: Nov. 10, 2005

(65) Prior Publication Data

US 2006/0070105 A1 Mar. 30, 2006

Related U.S. Application Data

(63) Continuation of application No. 09/711,469, filed on Nov. 13, 2000, now abandoned.

(30) Foreign Application Priority Data

Nov. 15, 1999 (JP) .................................... 11-324323
Nov. 8, 2000 (JP) ................................. 2000-340865

(51) Int. Cl.
*G06F 3/12* (2006.01)

(52) U.S. Cl. ......... 358/1.15; 358/1.13; 358/1.1; 725/93; 725/95; 725/135; 709/223; 348/143; 348/153; 348/207.1; 348/211.1

(58) Field of Classification Search .................. 348/143, 348/153, 156, 159, 207.1, 211.1, 211.3; 725/135, 725/136, 137, 138, 139, 140, 141, 142; 709/223; 358/1.15, 1.13, 1.1

See application file for complete search history.

(56) References Cited

U.S. PATENT DOCUMENTS

| | | | | |
|---|---|---|---|---|
| 5,175,851 A * | 12/1992 | Johnson et al. | | 707/8 |
| 5,249,290 A * | 9/1993 | Heizer | | 718/105 |
| 5,903,321 A * | 5/1999 | Tung et al. | | 348/715 |
| 6,067,624 A | 5/2000 | Kuno | | |
| 6,108,728 A | 8/2000 | Kobayashi | | |
| 6,133,941 A | 10/2000 | Ono | | |
| 6,134,584 A * | 10/2000 | Chang et al. | | 709/219 |
| 6,166,729 A | 12/2000 | Acosta et al. | | |
| 6,170,006 B1 | 1/2001 | Namba | | |
| 6,226,673 B1 * | 5/2001 | Yoshimoto | | 709/223 |
| 6,323,897 B1 | 11/2001 | Kogane et al. | | |
| 6,389,487 B1 | 5/2002 | Grooters | | |

(Continued)

FOREIGN PATENT DOCUMENTS

JP 10-42279 2/1998

(Continued)

OTHER PUBLICATIONS

Japanese Office Action dated Aug. 6, 2007 for corresponding Japanese patent application No. 2006-003054.

(Continued)

*Primary Examiner* — Mark K Zimmerman
*Assistant Examiner* — Martin Mushambo
(74) *Attorney, Agent, or Firm* — Cowan, Liebowitz & Latman, P.C.

(57) ABSTRACT

Upon distributing data from a first terminal apparatus to a second terminal apparatus, whether the data is to be distributed is determined in accordance with an access situation of a client to the first terminal apparatus, and, on the basis of a determined result, the data is distributed to the second terminal apparatus.

16 Claims, 17 Drawing Sheets

U.S. PATENT DOCUMENTS

| | | |
|---|---|---|
| 6,469,737 B1 | 10/2002 | Igarashi et al. |
| 6,556,241 B1 | 4/2003 | Yoshimura et al. |
| 6,564,380 B1 | 5/2003 | Murphy |
| 6,614,783 B1 | 9/2003 | Sonesh et al. |
| 6,675,386 B1 | 1/2004 | Hendricks et al. |
| 6,698,021 B1 | 2/2004 | Amini et al. |
| 7,386,872 B2 * | 6/2008 | Shimizu ........................ 725/105 |

FOREIGN PATENT DOCUMENTS

| | | |
|---|---|---|
| JP | A10-042185 | 2/1998 |
| JP | A10-042278 | 2/1998 |
| JP | A10-136347 | 5/1998 |
| JP | A10-164419 | 6/1998 |
| JP | A11-041505 | 2/1999 |
| JP | A11-055655 | 2/1999 |
| JP | 11-150723 | 6/1999 |
| JP | A11-150700 | 6/1999 |
| JP | A11-203299 | 7/1999 |
| JP | A11-220649 | 8/1999 |

OTHER PUBLICATIONS

An Office Action from the Japanese Patent Office issued on Nov. 11, 2005 for Japanese Patent Application No. 2000-340865.

* cited by examiner

F I G. 14A

| ENTRY NUMBER | VIDEO STORAGE START TIME | VIDEO STORAGE END TIME | UPLOAD TIME | PATTERN ID | FILE NAME |
|---|---|---|---|---|---|
| 1 | 12:00 | 12:10 | 13:00 | 1 | File 1 |
| 2 | 15:00 | 16:00 | 18:00 | 2 | File 2 |
| 3 | 21:00 | 21:30 | 23:00 | 1 | File 3 |
| ... | | | | | |

F I G. 14B

| PATTERN ID | OPERATION PATTERN SCRIPT |
|---|---|
| 1 | (20,20,1) 10 (30,20,2) 10 (-20,-20,4) 20* |
| 2 | (20,20,1) 60 (30,20,2) 60 (-20,-20,4) 60* |
| 3 | (0,0,1) 30 (40,20,2) 30 (-20,-20,1) |
| 4 | (30,20,2) |
| ... | |

CONTROL OF DATA DISTRIBUTION APPARATUS AND DATA DISTRIBUTION SYSTEM

This application is a continuation of prior application Ser. No. 09/711,469, filed Nov. 13, 2000, now abandoned the contents of which are hereby incorporated by reference in their entirety.

FIELD OF THE INVENTION

The present invention relates to a control method for an image distribution apparatus and an image distribution system, a control apparatus for an image distribution apparatus, and an image distribution system and, more particularly, to a technique of capturing a moving image from a video camera and distributing it.

BACKGROUND OF THE INVENTION

There is conventionally a system capable of observing an image sensed with a video camera from multiple remote points, which can not only observe the camera image but also remote-control the pan and tilt angles and zoom magnification of the camera. For example, as disclosed in, e.g., Japanese Patent Application Laid-Open No. 10-42279, a system has been proposed, in which a computer-controllable camera is connected through a WWW (World Wide Web) server on the Internet, and not only a real-time image sensed with the camera is distributed to one or more personal computers (PCs) connected to the Internet but also the PCs are allowed to control the camera.

Such an image distribution system capable of controlling the camera and distributing an image to a plurality of PCs (clients) has as its primary object to provide a real-time image. Hence, an image at a specific timing in the past cannot be seen later. To see the image in the past later, the operator must operate to sense the image by the camera, convert the image into a predetermined format, and record it in a secondary storage device on the WWW server in advance. The image thus recorded can be seen later through the Internet using a Web browser.

Hence, to allow the WWW server to distribute an image in order to provide the image recorded in the past, an operation is necessary, in which the operator operates to sense the image by the camera, convert the sensed image data into compressed digital data browsable on the Internet, and store the data in the WWW server. This requires labor as well as operation skill of the camera operator.

SUMMARY OF THE INVENTION

The present invention has been made in consideration of the above situation, and has as its object to store a desired image as image data in a format quickly and properly browsable on the Internet without labor and operation skill of the camera operator.

It is another object of the present invention to properly notify a camera operator or a person who requests operation of the start/end timing of camera operation.

It is still another object of the present invention to make image data easy to browse.

According to the present invention, the foregoing object is attained by providing a data distribution method of distributing data from a first terminal apparatus to a second terminal apparatus, comprising: a determination step of determining whether the data is to be distributed in accordance with an access situation of a client to the first terminal apparatus; and a distribution step of distributing the data to the second terminal apparatus on the basis of a determination result of said determination step.

According to the present invention, the foregoing object is also attained by providing a data distribution method of distributing data from a first terminal apparatus to a second terminal apparatus, comprising: a reception step of receiving, from the second terminal apparatus, an access situation of a client to the second terminal apparatus; a determination step of determining whether the data is to be distributed in accordance with the access situation of the client to the second terminal apparatus, which is received in the reception step; and a distribution step of distributing the data to the second terminal apparatus on the basis of a determination result of the determination step.

Further, the foregoing object is also attained by providing an image distribution method comprising: an image sensing control step of executing image sensing operation of a camera at a preset time; a control right giving step of giving a control right for the camera to a requesting client for a predetermined time; and a notification step of, when a period from the time at which the control right is given in said control right giving step to the time at which the camera is controlled in the image sensing control step is less than the predetermined time, notifying the client of, as a period when the control right for the camera is given, the period from the time at which the control right is given in the control right giving step to the time at which the camera starts being controlled in the image sensing control step.

Furthermore, the foregoing object is also attained by providing a data distribution apparatus of distributing data to an external terminal apparatus, comprising: determination means for determining whether the data is to be distributed in accordance with an access situation of a client to the data distribution apparatus; and distribution means for distributing the data to the external terminal apparatus on the basis of a determination result of the determination means.

Further, the foregoing object is also attained by providing a data distribution apparatus of distributing data to an external terminal apparatus, comprising: reception means for receiving, from the external terminal apparatus, an access situation of a client to the external terminal apparatus; determination means for determining whether the data is to be distributed in accordance with the access situation of the client to the external terminal apparatus, which is received by the reception means; and distribution means for distributing the data to the external terminal apparatus on the basis of a determination result of the determination means.

Further, the foregoing object is also attained by providing an image distribution apparatus comprising: image sensing control means for executing image sensing operation of a camera at a preset time; control right giving means for giving a control right for the camera to a requesting client for a predetermined time; and notification means for, when a period from the time at which the control right is given by said control right giving means to the time at which the camera is controlled by said image sensing control means is less than the predetermined time, notifying the client of, as a period when the control right for the camera is given, the period from the time at which the control right is given by the control right giving means to the time at which the camera starts being controlled by the image sensing control means.

Other features and advantages of the present invention will be apparent from the following description taken in conjunc-

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 14A and 14B are views showing the upload schedule table and pattern table in the embodiment of the present invention, respectively;

DETAILED DESCRIPTION OF THE PREFERRED EMBODIMENT

A preferred embodiment of the present invention will be described in detail in accordance with the accompanying drawings.

In the present embodiment, normally, not only a camera control function is provided while distributing a real-time image to a plurality of users but also an image is sensed by automatically operating the camera in accordance with several specific camera control patterns designated in advance, and the moving image or still image data obtained by image sensing is temporarily stored and automatically transferred (uploaded) to a WWW server at a predetermined timing.

Figure 1:
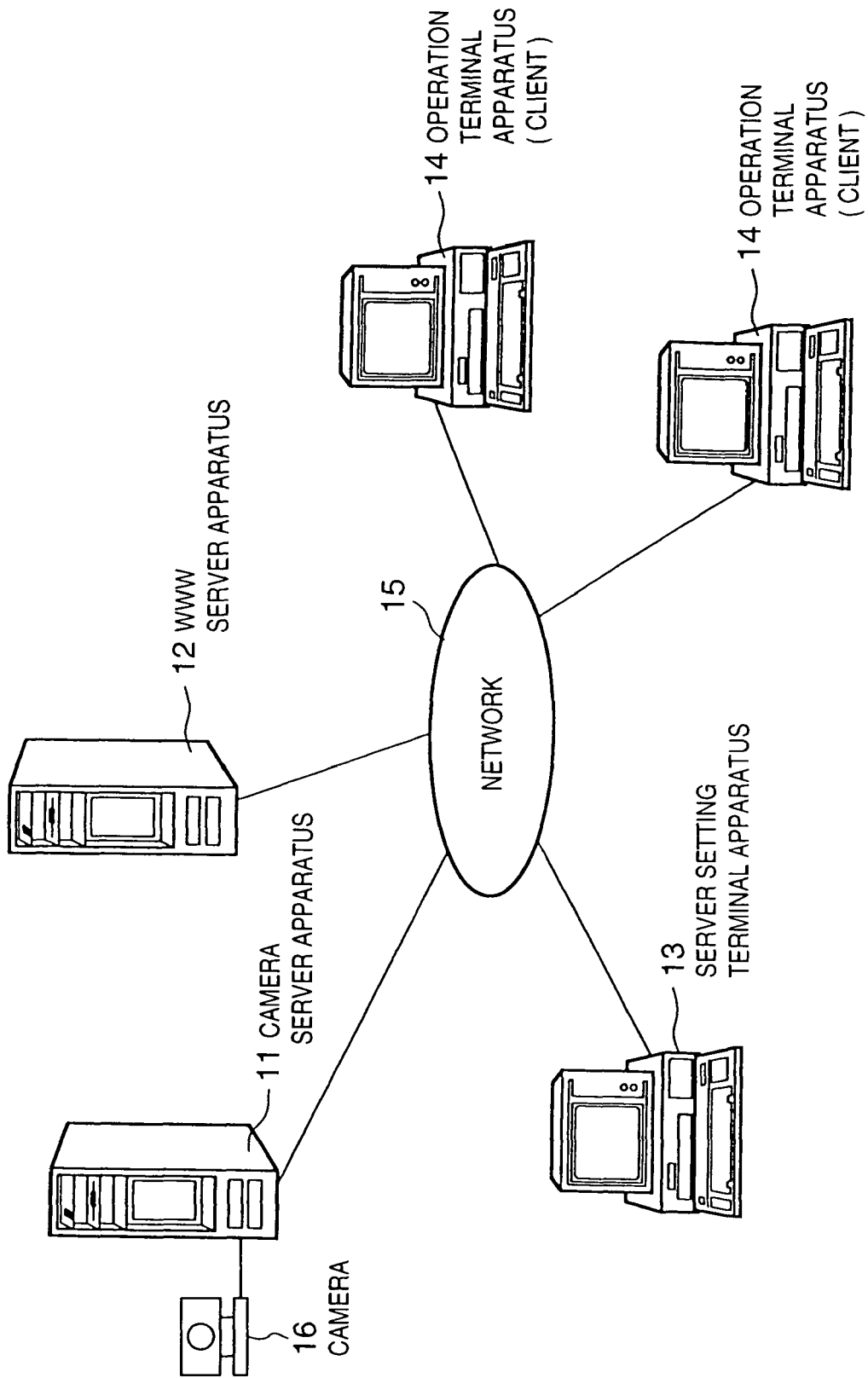
FIG. 1 is a view showing the overall arrangement of an image sensing system according to an embodiment of the present invention.

FIG. 1 is a view showing the overall arrangement of an image sensing system according to the embodiment of the present invention.

Reference numeral 11 denotes a camera server apparatus; 12, a WWW (World Wide Web) server apparatus; 13, a server setting terminal apparatus; and 14, an operation terminal apparatus (client). These apparatuses are connected through a network 15.

A camera 16 capable of panning, tilting, and zooming operations is connected to the camera server apparatus 11 through an RS-232C or the like. The camera 16 can be controlled from each operation terminal apparatus 14 while distributing a real-time image to the operation terminal apparatuses 14 through the network 15 in accordance with the requests from the operation terminal apparatuses 14. The camera server apparatus 11 automatically operates the camera 16 at a specific timing designated in advance in accordance with several camera control patterns designated in advance, and the data of a sensed image is temporarily stored in the camera server apparatus 11 as an image file and automatically transferred to the WWW server apparatus 12. Note that the camera 16 may be integrated with the camera server apparatus 11.

The server setting terminal apparatus 13 sets the camera control patterns and automatic camera operation timings in the camera server apparatus 11. The set data are stored in the camera server apparatus 11.

For each kind of apparatuses and operation terminal apparatuses, a plurality of apparatuses can be connected to the network 15. In this embodiment, one apparatus of each kind is connected for the descriptive convenience, except for the operation terminal apparatus 14. The network 15 can be a digital network such as the Internet or intranet having a sufficient band for transmitting a camera control signal and compressed video signal (to be described later). In this embodiment, the TCP/IP (UDP/IP) protocol is used as a network protocol. An address will mean an IP address hereinafter. All of the camera server apparatus 11, WWW server apparatus 12, server setting terminal apparatus 13, and operation terminal apparatuses 14 are assigned IP addresses. However, the present invention can be applied not only to the TCP/IP protocol but also to various known communication protocols.

The arrangement of each apparatus will be described below.

Figure 2:
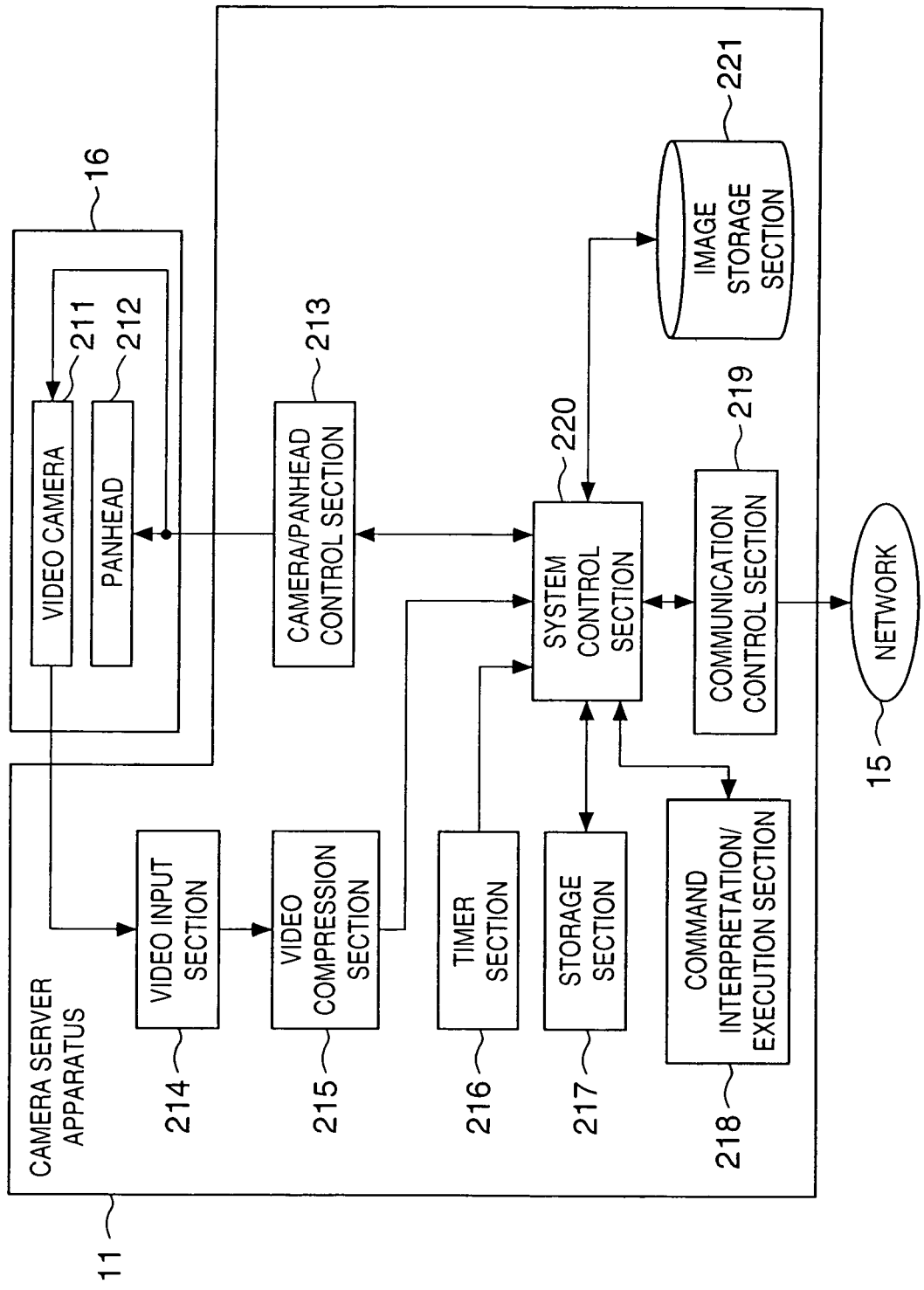
FIG. 2 is a block diagram showing the arrangement of a camera server apparatus shown in FIG. 1.

FIG. 2 is a block diagram showing the arrangement of the camera server apparatus 11.

The camera server apparatus 11 controls a video camera 211 and a panhead 212 for controlling the pan and tilt angles of the video camera 211 and comprises a camera/panhead control section 213 for controlling the zoom magnification of the video camera 211 and the pan and tilt angles of the panhead 212, a video input section 214 for receiving an image from the video camera 211, a video compression section 215 for compressing the received video data, a communication control section 219 for distributing the compressed video data onto the network 15, a command interpretation/execution section 218 for interpreting a command received from the operation terminal apparatuses 14 through the network 15 and controlling each section of the camera server apparatus 11, a timer section 216 for scheduling the timing of video data to be uploaded to the WWW server apparatus 12, a storage section 217 used to store camera operation patterns and upload schedule, an image storage section 221 for storing an image, and a system control section 220 for controlling all of these sections.

The camera server apparatus 11 having the above arrangement captures an image from the video camera 211 and distributes it to the operation terminal apparatuses 14, and at the same time, stores the image as a file in accordance with the schedule set by the server setting terminal apparatus 13 and uploads the image to the WWW server apparatus 12. The camera server apparatus 11 also receives a camera control command from the operation terminal apparatuses 14 and controls the zoom magnification of the video camera 211 and the panhead 212.

The video input section 214 captures an NTSC video signal from the video camera 211 and A/D-converts the video signal. Then, the data is compressed by a scheme such as Motion JPEG, and the compressed video data is stored in the image storage section 221 in order to transfer the data to the communication control section 219 and send it to the network 15. As the video compression scheme, MotionJPEG is used here. However, the present invention is not limited to MotionJPEG compression, and any other compression scheme can be used, including H263 using interframe correlation capable of realizing a higher compression ratio.

Figure 3:
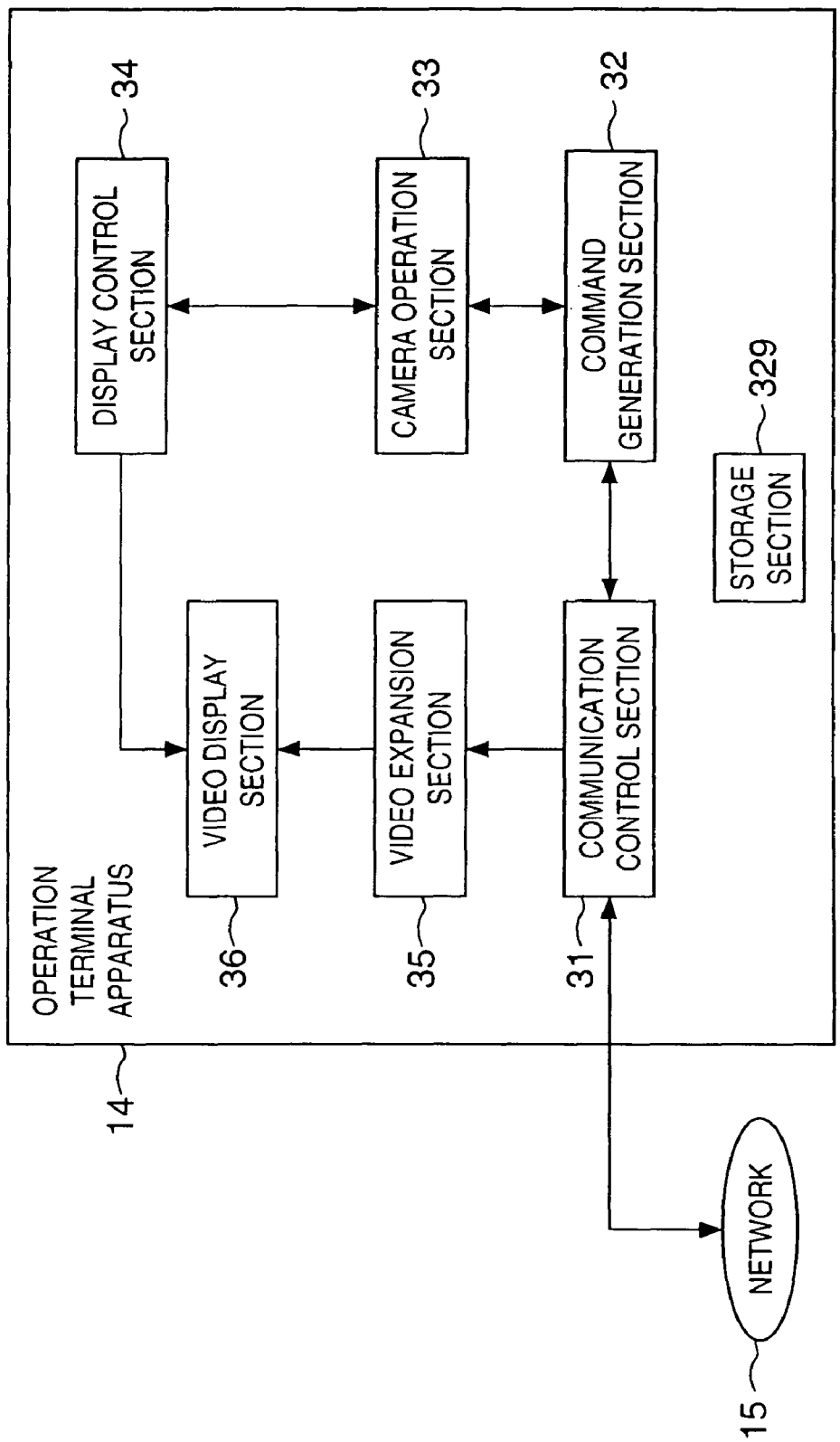
FIG. 3 is a block diagram showing the arrangement of an operation terminal apparatus shown in FIG. 1.

FIG. 3 is a block diagram showing the arrangement of the operation terminal apparatus 14.

The operation terminal apparatus 14 receives, through a communication control section 31, compressed video data distributed from the camera server apparatus 11 through the network 15, expands the video data by a video expansion section 35, and displays it on a video display section 36. In addition, camera control operation is enabled by operating the user interface (UI) displayed on the operation terminal apparatus 14. The window display and operation are controlled by a display control section 34.

The video display section 36 includes a bitmap display. A certain window system such as Windows95 or X-Window capable of constituting a UI window as shown in FIG. 13 runs on the operation terminal apparatus 14 to display the user interface window shown in FIG. 13.

Figure 13:
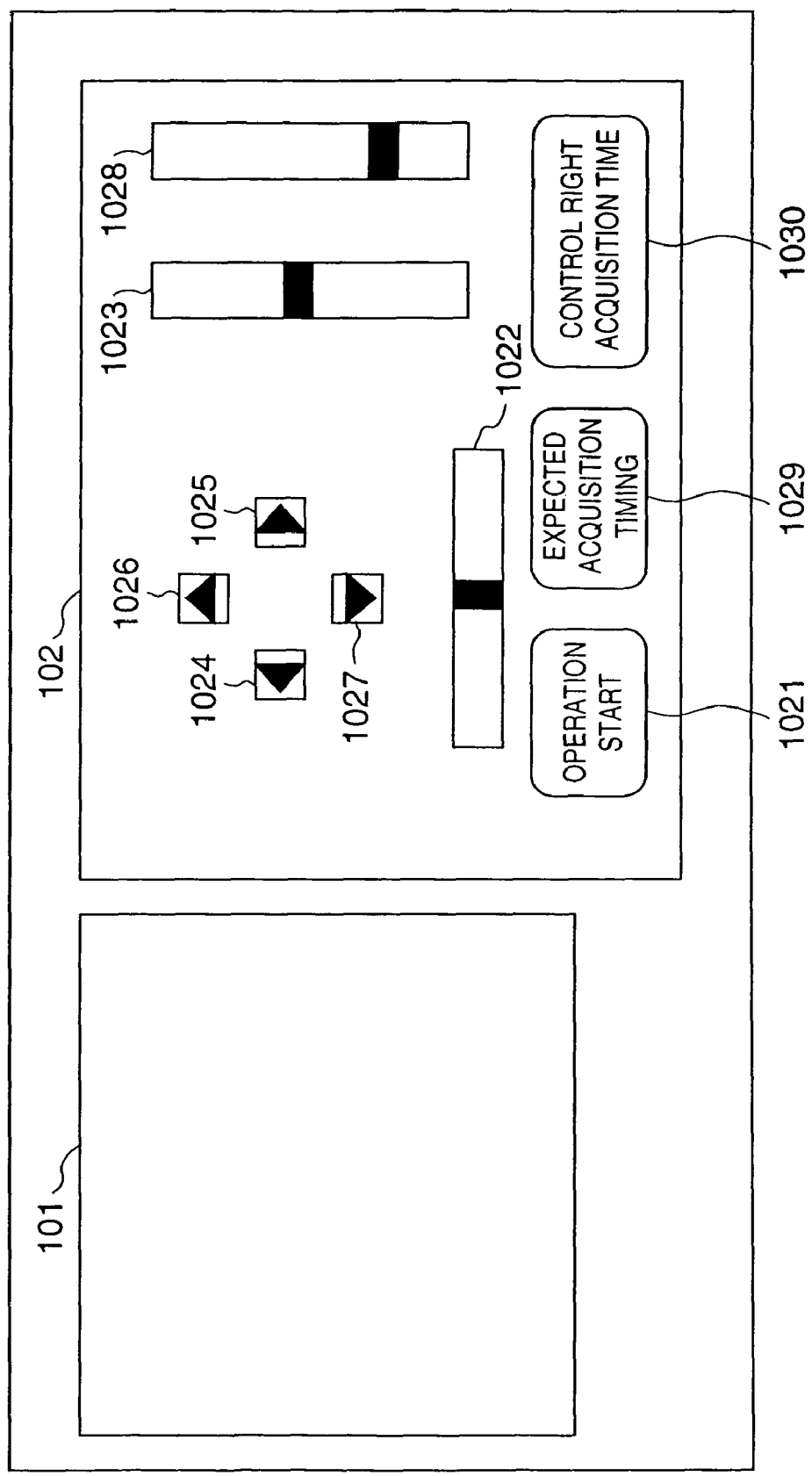
FIG. 13 is a view showing the user interface window.

Referring to FIG. 13, an image is displayed on a video display panel 101. A camera control panel 102 is used to operate the camera. Panning, tilting, and zooming of the camera can be controlled by operating scroll bars 1022, 1023, and 1028. Pan/tilt control can also be done using buttons 1024 to 1027.

The video camera 211 assumes simultaneous access from a plurality of operation terminal apparatuses 14. In this case, if the users of the plurality of operation terminal apparatuses 14 try to operate the camera in, e.g., the image sensing direction, confusion occurs. Hence, a "control right" concept is introduced such that only a user having the control right can control the camera. It should be noted that a plurality of operation terminal apparatuses are allowed to access only for seeing the real time image which the camera senses.

For example, when a user wants to control the video camera 211, he/she requests the control right from the camera server apparatus 11. If no client has the control right for the video camera 211 at that time, the control right is given to the user who has requested the control right. The control right is given for a predetermined time period. While the user has the control right, he/she can control the video camera 211. When the control right is requested, and another operation terminal apparatus 14 has the control right for the video camera 211, the control right is given after the control right of that operation terminal apparatus 14 has expired. The time while the control right is being given, the priority of each client, and the like can be set in various ways. A detailed description of the control right is also disclosed in Japanese Patent Application Laid-Open No. 10-42279.

In this embodiment, to request the control right, a camera control connection request command is sent to the camera server apparatus 11 by pressing an operation start button 1021. When the camera operation right can be acquired, the user can operate the video camera 211.

The operation of the image sensing system will be described next.

Figure 4:
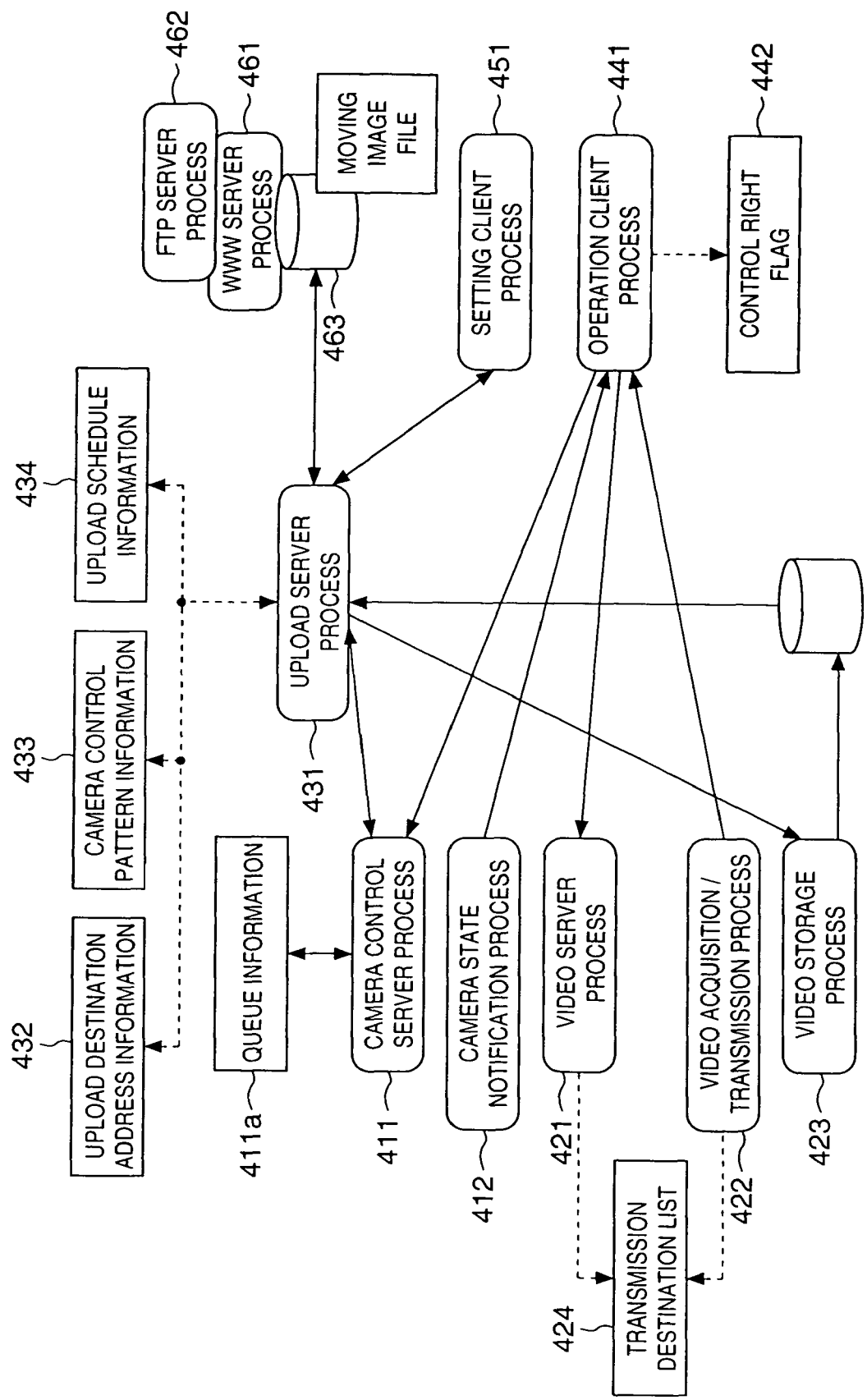
FIG. 4 is a view showing the processes in the embodiment of the present invention.

FIG. 4 is a view showing the processes in this embodiment. A process means a process of a multitask operating system such as WindowsNT and UNIX. In this embodiment, a plurality of processes 411, 412, 421, 422, 431, 441, 451, 461, and 462 shown in FIG. 4 run. A process 423 is activated and ended as needed.

In the camera server apparatus 11, of the processes shown in FIG. 4, the camera control server process 411 for receiving a camera control instruction issued by the operation client process 441, sending an instruction to the camera control section 213, and controlling the camera 16, the camera state notification process 412 for detecting states such as the pan and tilt angles of the camera 16 and notifying the operation client process 441 of them, the video server process 421 for managing the camera image transmission destination, the video acquisition/transmission process 422 for capturing and transmitting the image sensed by the camera 16, the video storage process 423 activated by a video storage start instruction (1211 in FIG. 12) from the upload server process 431 to store video data sensed by the camera 16 in the image storage section 221 as a file, and the upload server process 431 for instructing the start/end of the video storage process 423 and uploading an image data file stored in the image storage section 221 to the WWW server apparatus 12 using the FTP (File Transfer Protocol) operate. The camera control server process 411 holds the number (m) of clients requesting general control connection, to be described later, of the camera as queue information 411a.

As the image data file format in this embodiment, the video storage start timing (i.e., start time of automatic operation of the camera) is added to the MotionJPEG format.

In the WWW server apparatus 12, the WWW server process 461 and FTP server process 462 operate. The FTP server process 462 receives a video data file from the upload server process 431 and stores it in a secondary storage device 463 managed by the WWW server process 461.

On the operation terminal apparatus 14, the operation client process 441 operates.

A transmission destination list 424 is a common storage section used for data transfer between the processes.

Referring to FIG. 4, storage sections 432, 433, and 434 store upload destination address information, camera control pattern information, and upload schedule information set by the setting client process 451, respectively. The upload server process 431 reads in these settings and operates in accordance with the settings.

The upload destination address information 432 is information related to the address of the WWW server apparatus 12 to which the image is to be uploaded. The camera control pattern information 433 is information related to a pattern used to sequentially move the camera in the image sensing directions when storing an image to be uploaded. The information 433 allows setting a video storage time in each image sensing direction. The upload schedule information 434 stores information related to the video storage start timing based on the camera control pattern information 433 and the upload time of the stored image to the WWW server apparatus 12.

Figure 12:
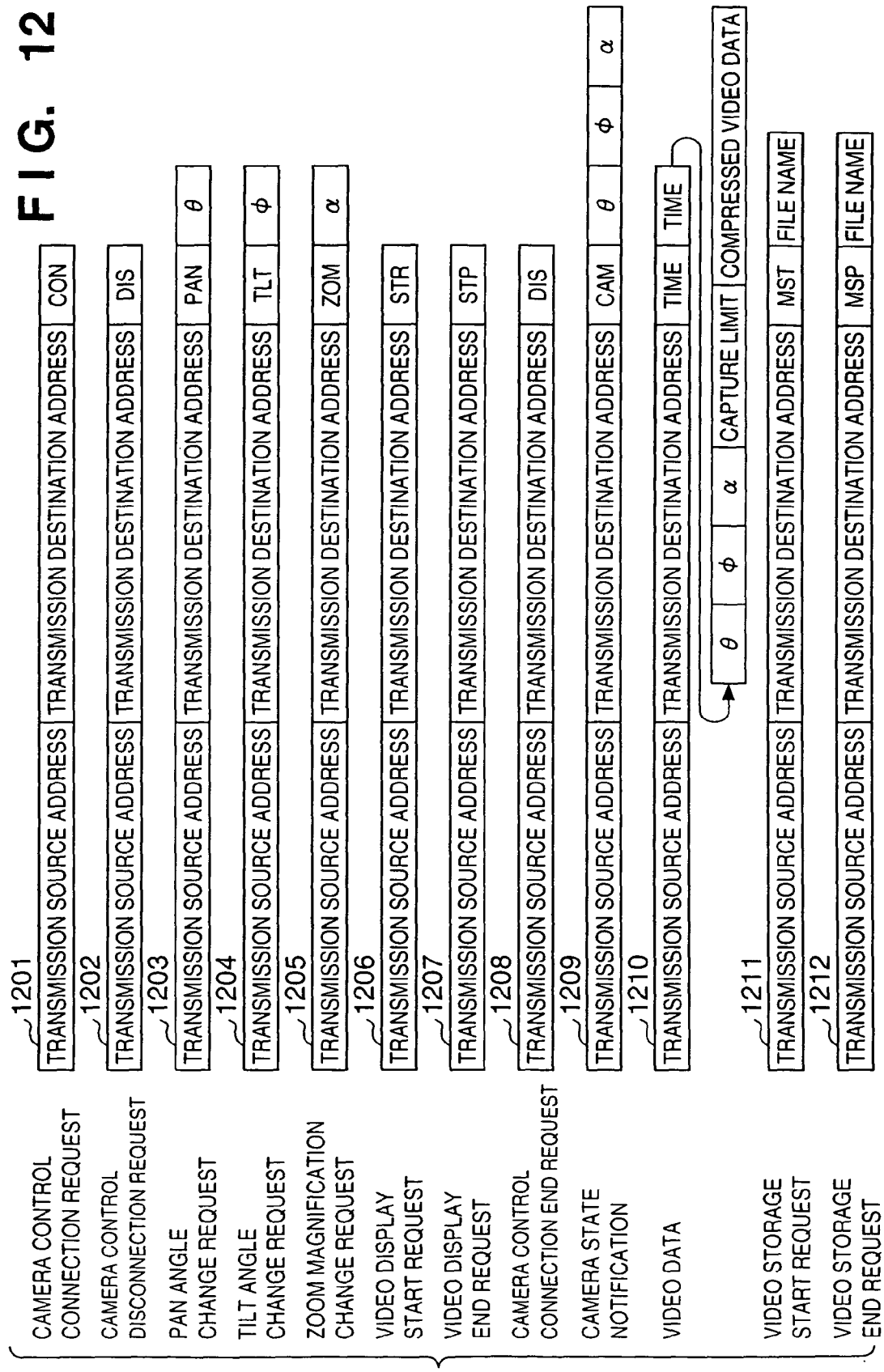
FIG. 12 is a view showing packet formats.

As packets communicated between the apparatuses, those having formats shown in FIG. 12 are generated and transmitted through the network 15. Strictly speaking, although formats used for packets of TCP/IP or UDP/IP are used, only packet formats necessary for the description of the embodiment are shown in FIG. 12.

The video server process, video acquisition/transmission process, and video storage process which operate in the camera server apparatus 11 will be described first in detail with reference to the flow charts shown in FIGS. 5 to 7.

When the video server process 421 is activated in step S500, initialization is executed in step S501. After the video acquisition/transmission process 422 is generated in step S502, an event input from the operation client process 441 or upload server process 431 is waited in step S503. The video acquisition/transmission process 422 will be described later with reference to FIG. 7.

When an event is input in step S503, the type of the input event is checked. If the input event is a video display start request command (1206 in FIG. 12) (YES in step S504), the packet transmission source address contained in the video display start request packet is confirmed, the address is added to the video transmission destination list 424 (step S505), and Ack is returned (step S506).

If the event input in step S503 is a video display end request command (1207 in FIG. 12) (YES in step S507), the packet transmission source address contained in the video display end request packet is confirmed, and the address is deleted from the video transmission destination list 424 (step S508). Note that the video transmission destination list 424 holds the addresses of video transmission destinations in the form of a list.

If the event input in step S503 is the video storage start request command (1211 in FIG. 12) (YES in step S509), the video storage process 423 is generated using the file name contained in the video storage start request command as an argument in step S510. Hence, the video storage process 423 is generated every time a video storage start request command is received. This video storage start request command is issued by the upload server process 431 in step S804 shown in FIG. 11 to be described later.

The operation of the video storage process 423 will be described with reference to FIG. 6.

When the video storage process 423 is generated and activated in step S530 in response to reception of the video storage start request command, a file having a name contained in the video storage start request command and designated as an argument is generated in step S531. Until the process is forcibly ended (until YES in step S532), an image from the video camera 211 is captured as digital data (step S533), compressed (step S534), and written in the file (step S535). To end the process, the file is stored in step S536, and the process is ended.

Figure 5:
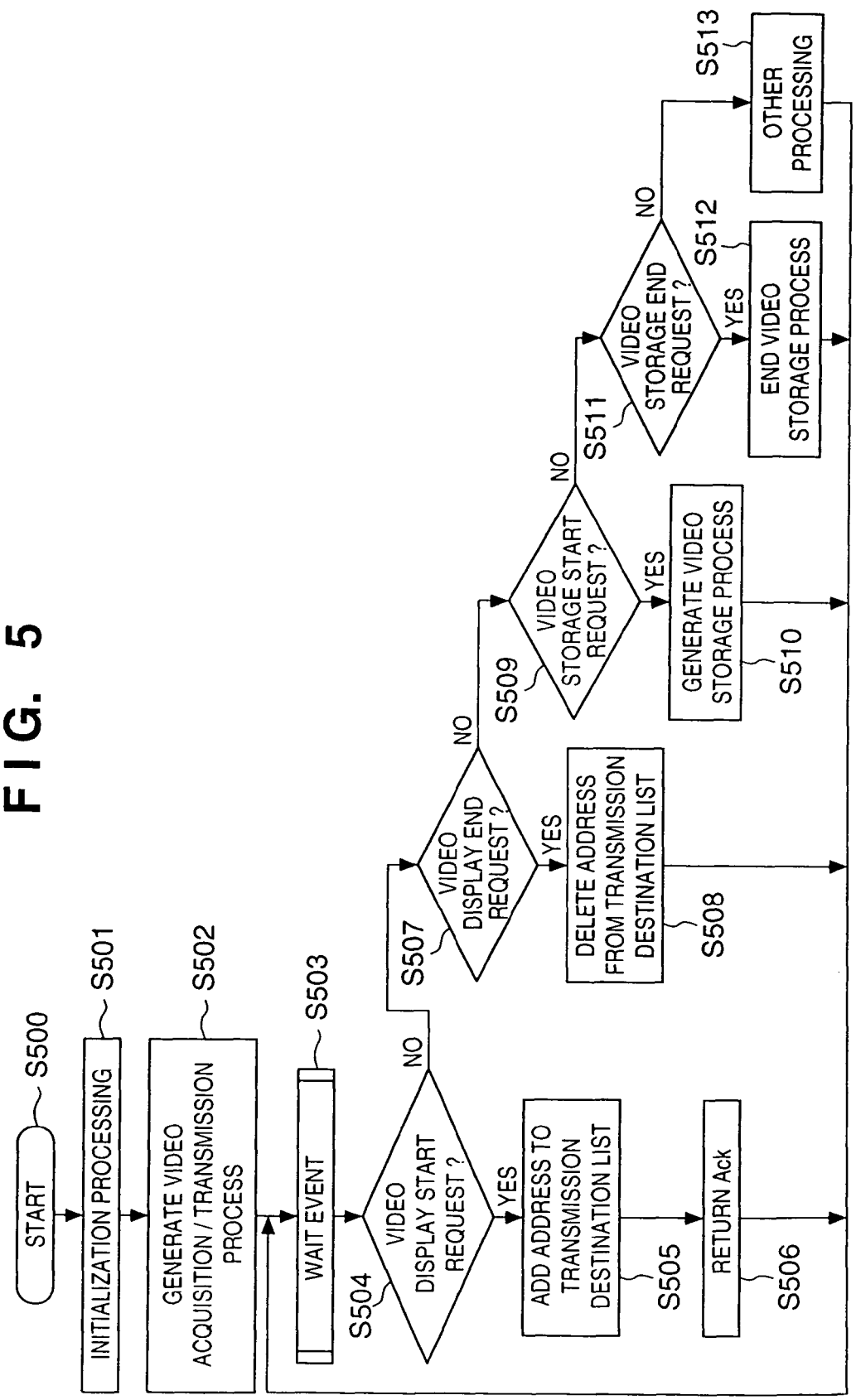
FIG. 5 is a flow chart showing details of operation of video server process in the embodiment of the present invention.
Figure 6:
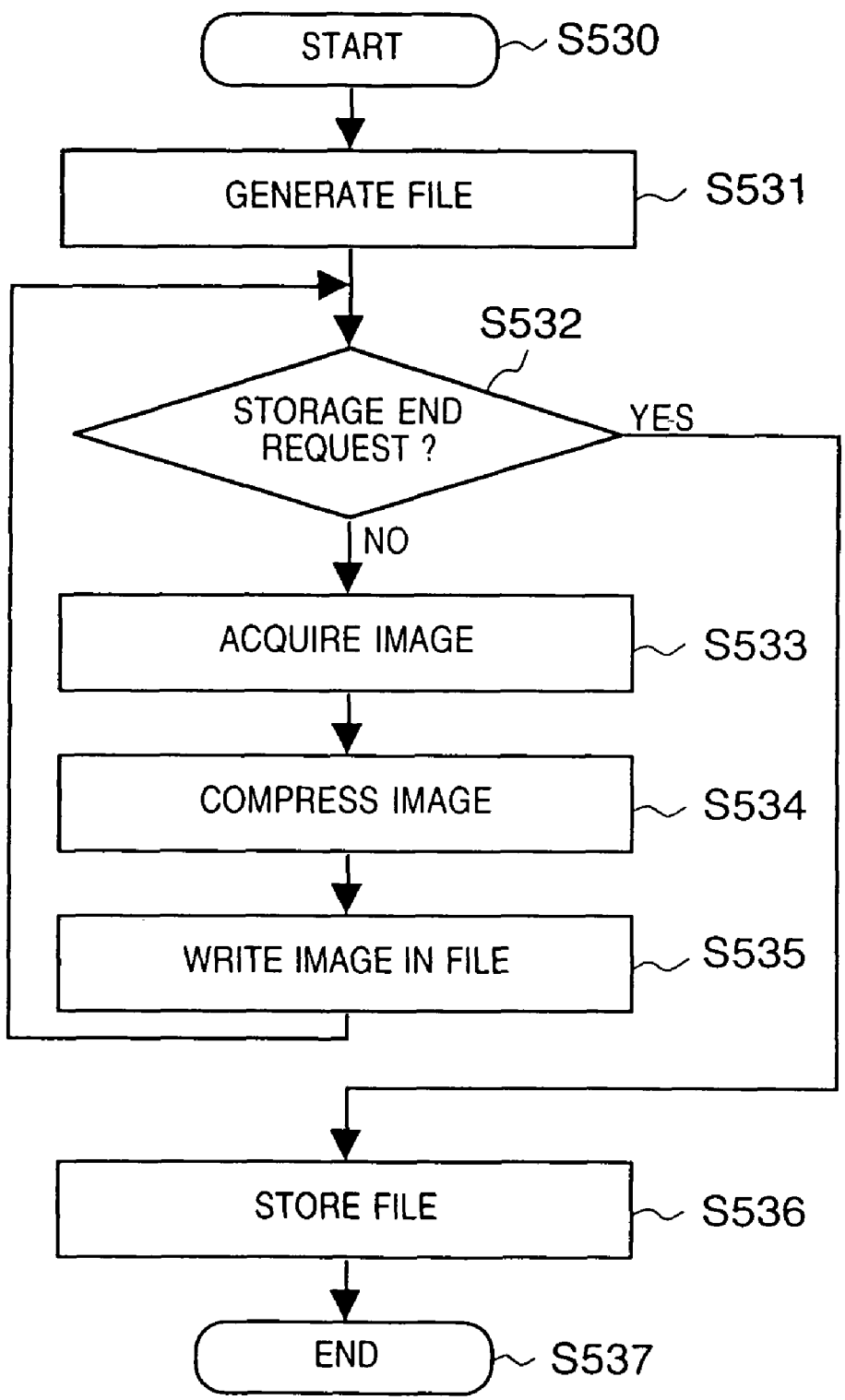
FIG. 6 is a flow chart showing details of operation of video storage process in the embodiment of the present invention.

The process is ended when it is determined in step S511 in FIG. 5 that the event input in step S503 is a video storage end request command (1212 in FIG. 12) issued from the upload server process 431, and the command is sent to the video storage process 423 in step S512. When YES in step S532 in FIG. 6, the process is ended.

If the event input in step S503 corresponds to none of the above commands (NO in step. S511), processing corresponding to the received event is executed in step S513.

Figure 7:
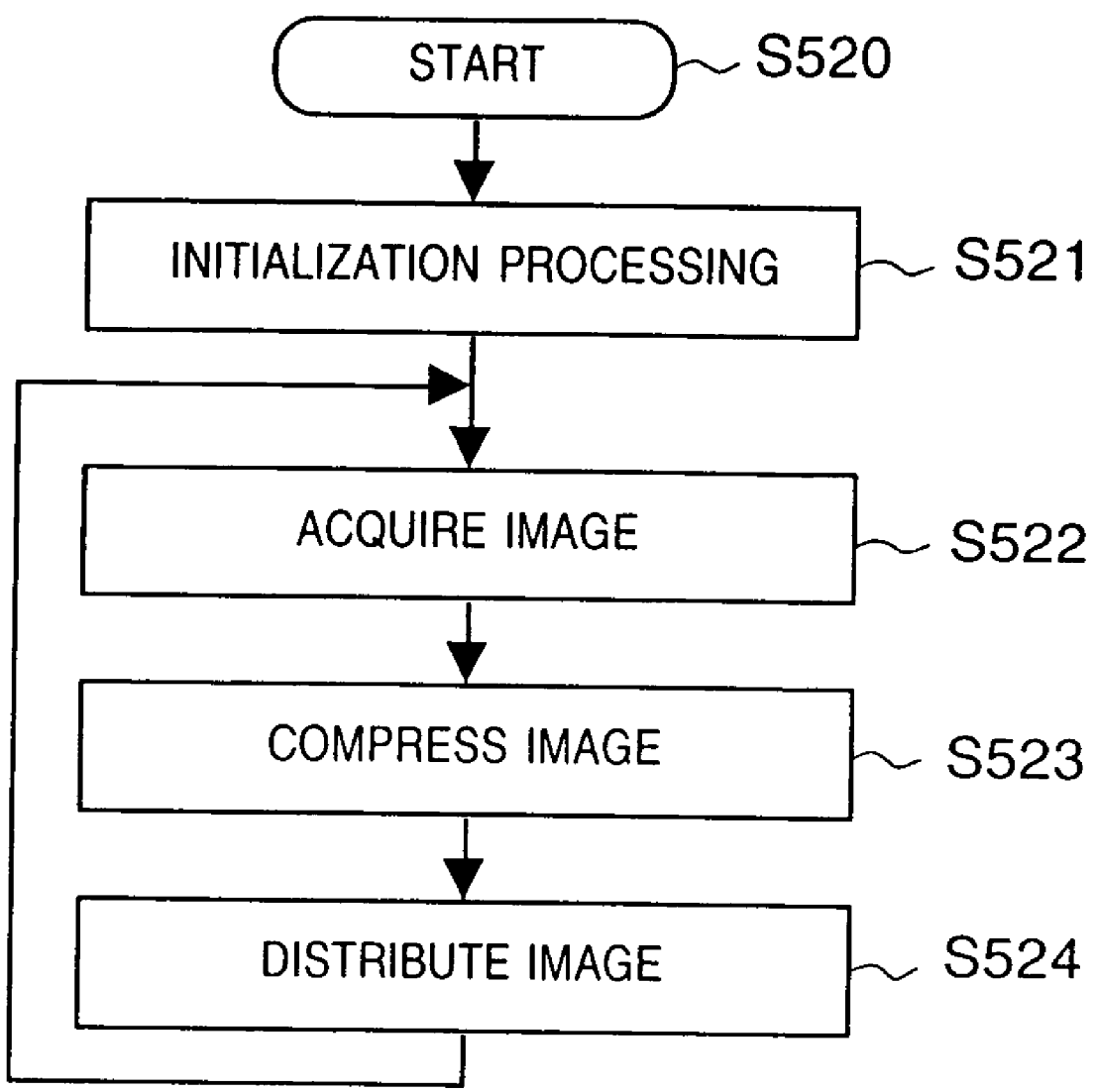
FIG. 7 is a flow chart showing details of operation of video acquisition/transmission process in the embodiment of the present invention.

When the video acquisition/transmission process 422 is generated in step S502, the operation shown in the flow chart of FIG. 7 is repeated. More specifically, when the video acquisition/transmission process 422 is activated in step S520, and initialization is performed in step S521, an image from the video camera 211 is captured in units of frames in step S522 and compressed in step S523. The compressed video data is formed into a packet 1209 shown in FIG. 12 and transmitted to a plurality of addresses in the video transmission destination list 424 (step S524).

The camera control server process 411 and camera state notification process 412 will be described next with reference to FIGS. 8 and 9.

In the embodiment of the present invention, two types of connection for camera control (control right) are used: general control connection and privilege control connection. The general control connection is normal connection by the operation client process 441. The privilege control connection is connection by the upload server process 431. The privilege control connection has priority over the general control connection. The normal general control connection by the operation client process 441 is disconnected when the privilege control connection is requested.

Figure 8:
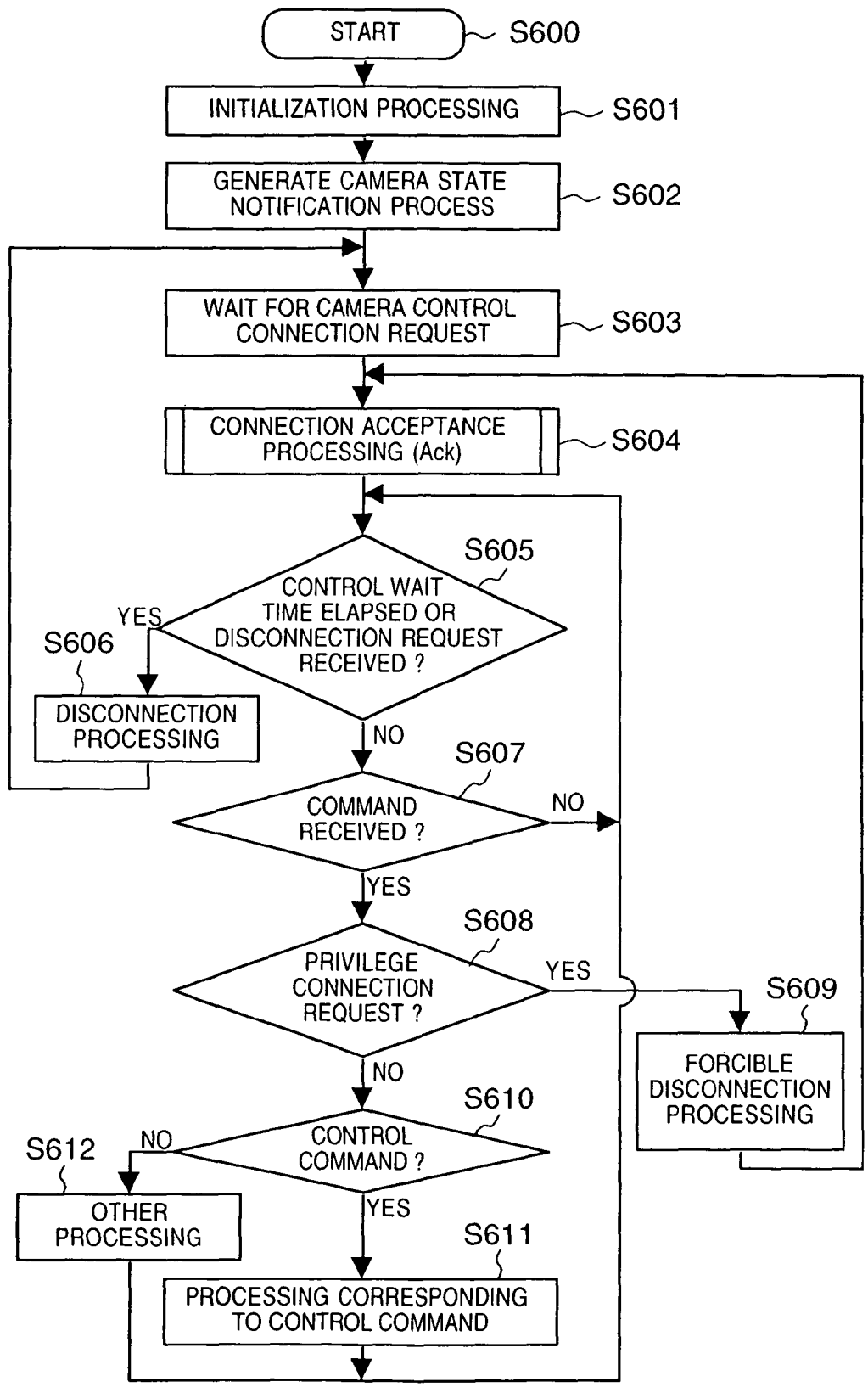
FIG. 8 is a flow chart showing details of operation of camera control server process in the embodiment of the present invention.
Figure 9:
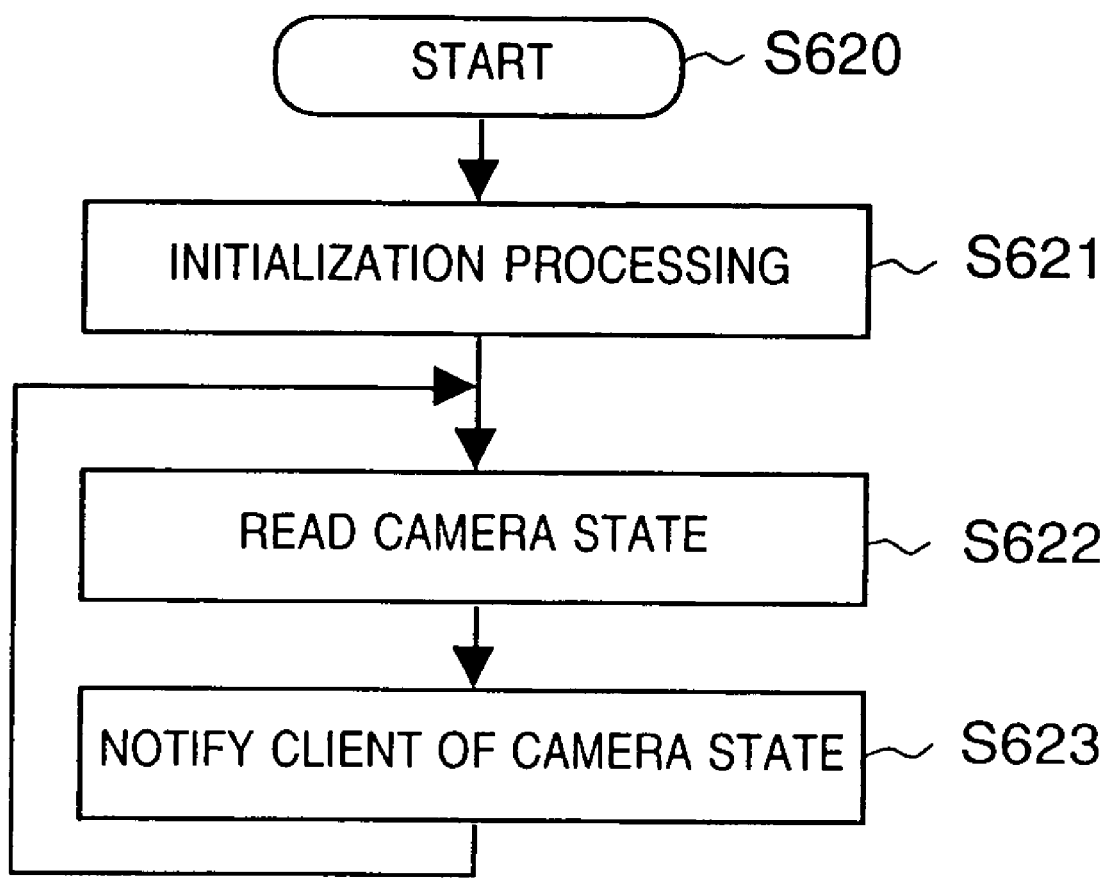
FIG. 9 is a flow chart showing details of operation of camera state notification process in the embodiment of the present invention.

Referring to FIG. 8, when the camera control server process 411 is activated in step S600, and initialization is ended in step S601, the camera state notification process 412 is generated in step S602, and a camera control connection request (1201 in FIG. 12) from the operation client process 441 and upload server process 431 is waited in step S603. The camera control connection request (general control connection) is generated and transmitted from the client process 441 when the operation start button 1021 shown in FIG. 13, which is displayed on the operation terminal apparatus 14 is pressed, as described above. In this step of waiting for the camera control connection request (step S603), both of the general control connection and the privilege control connection are waited.

When a general control connection request is received from the operation client process 441, connection reception processing is executed (Ack is returned) in step S604.

Figure 15:
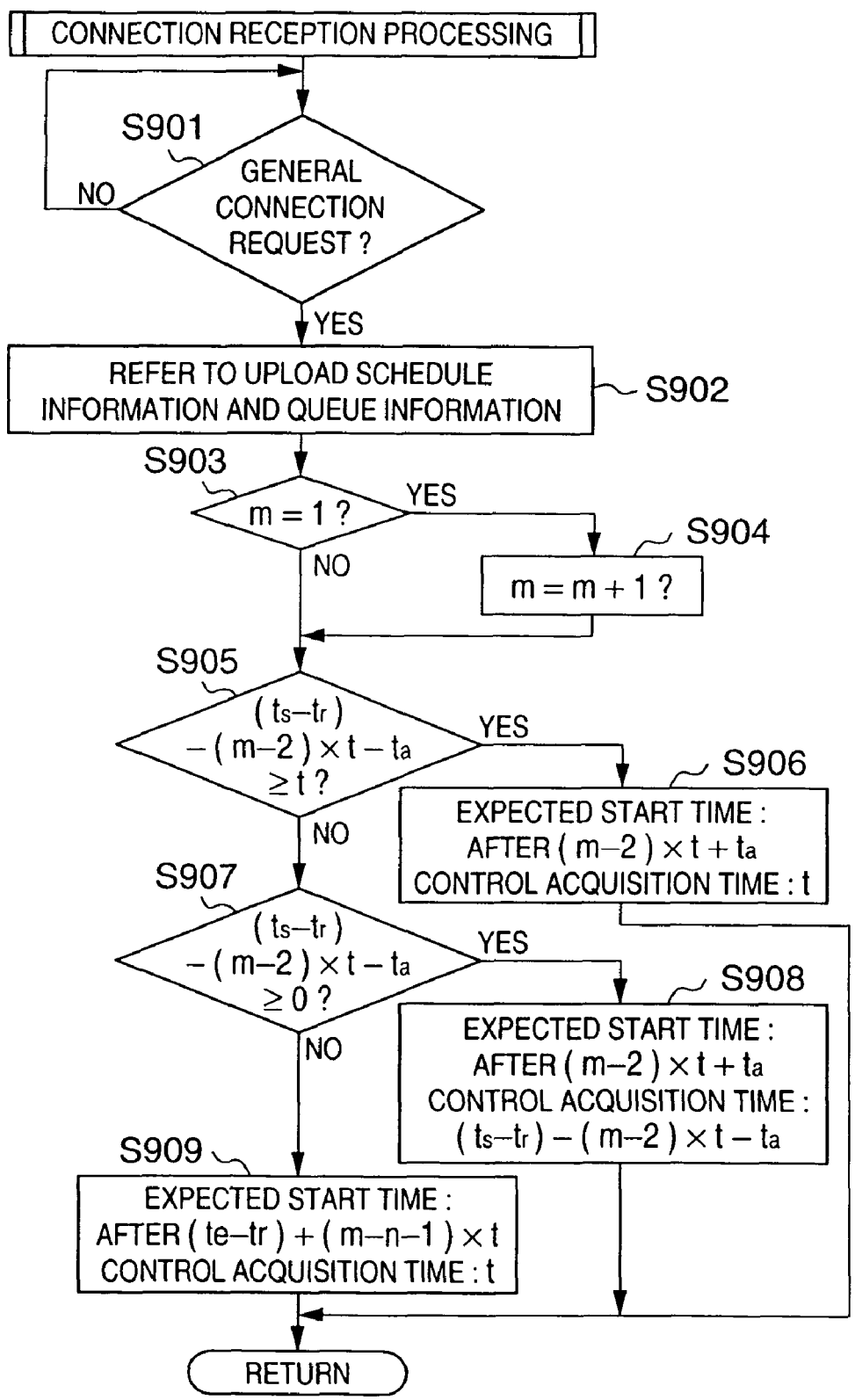
FIG. 15 is a flow chart showing details of operation of connection reception process in the embodiment of the present invention.

Connection reception processing in step S604 will be described below in detail with reference to the flow chart of the camera control server process 411 shown in FIG. 15.

In step S901, when a general connection request is received, the flow advances to step S902. In step S902, the upload server process 431 is accessed, and the video storage start timing (ts) based on the camera control pattern information 433 is referred to from the upload schedule information 434. In addition, the number (m) of clients 14 requesting the general control connection of the camera is referred to from the queue information 411a.

In step S903, whether m is 1 or not, namely, whether or not there is any client 14 currently having the control right is determined. If not, the process proceeds to step S905, whereas if m is 1, 1 is added to m so as to conform to condition check performed in the subsequent steps in step S904 and the process proceeds to step S905.

In step S905, on the basis of the upload schedule information and queue information (m) obtained in step S902 or S904, it is determined whether $$(ts-tr)-(m-2) \times t-ta \geq t \qquad (1)$$

where tr is the current time, and ta is the remaining camera-controllable time of the client 14 currently having the control right (the first client in the queue). Note, if there is no client currently having the control right (i.e. if m obtained in step S902 is 1), ta is 0.

More specifically, it is determined in step S905 whether the camera control right can be given to the client 14 who has newly requested general connection (the m-th client in the queue) for the maximum camera-controllable time (t) for one general connection request.

If condition (1) is satisfied, the flow advances to step S906 to notify the client who has newly requested general connection (the mth client in the queue) that the expected acquisition timing of the camera control right is (m−2)×t+ta after the current time, and the camera control right will be given for the maximum time t. On the other hand, when condition (1) is not satisfied, the flow advances to step S907.

In step S907, it is determined whether $$(ts-tr)-(m-2)\times t-ta \geqq 0 \quad (2)$$

More specifically, it is determined in step S907 whether the camera control right can be given to the client 14 who has newly requested general connection (the m-th client in the queue) until the image sensing start timing ts of the camera based on the camera control pattern information 433.

If condition (2) is satisfied, the flow advances to step S908 to notify the client 14 who has newly requested general connection (the m-th client in the queue) that the expected acquisition timing of the camera control right is (m−2)×t+ta after the current time, and the camera control time will be (ts−tr)−(m−2)×t−ta.

On the other hand, when condition (2) is not satisfied, the flow advances to step S909 to notify the client 14 who has newly requested general connection (the m-th client in the queue) that the expected acquisition timing of the camera control right is (te−tr)+(m−n−1)t after the current time, and the camera control right will be given for the maximum time t, wherein te is the video storage end timing which is obtained from the camera control pattern information 433, and n is the number of clients to which the camera control right is given before the time ts. n can be obtained by rounding up the calculated value of the equation (ts−tr−ta)/t+1 at the decimal point.

As described above, regardless of the existence of the video storage period based on the camera control pattern information 433, the operation terminal apparatus 14 who has requested general connection can be appropriately notified of information related to the expected acquisition timing of the camera control right and control right acquisition time.

The expected acquisition timing of the camera control right and the camera control right acquisition time, which are notified from the camera server apparatus 11, are displayed on display sections 1029 and 1030 shown in FIG. 13, respectively.

Returning to the flow of FIG. 8, camera control commands (1203 to 1205 in FIG. 12) transmitted from the operation client process 441 that has sent the camera control right request are waited (steps S605 and S607). A timer is set simultaneously with reception processing in step S604, and when a predetermined time (to be referred to as a "control wait time" hereinafter) has elapsed (YES in step S605) without any command input (NO in step S607), control connection is disconnected in step S606.

When a command is received in step S607, and it is a privilege control connection request from the upload process 431 (YES in step S608), the flow advances to step S609 to disconnect the general control connection even during waiting for a control command, and reception processing for the privilege control connection is executed. Until the privilege control connection thus connected is disconnected, camera control requests from the upload server process 431 are received (step S607). In privilege control connection, disconnection processing is performed in step S606 in accordance with not the elapse of control wait time but issue of a camera control disconnection request (1202 in FIG. 12) in step S605.

When a command is received in step S607, and it is a camera control command (1203 to 1205 in FIG. 12) (NO in step S608 and YES in step S610), the flow advances to step S611 to control the zoom magnification of the video camera 211 or the pan and tilt angles of the panhead 212 through the camera/panhead control section 213 in accordance with the camera control command. If another command is received (NO in step S610), processing corresponding to the received command is performed.

In the above way, until the control wait time elapses or a disconnection instruction is received, camera control commands are received from the operation client process 441 in accordance with the type of connection, and the camera 16 is controlled in accordance with each command through the command interpretation section 218 and camera/panhead control section 213.

In disconnection processing in step S606, a camera control connection end instruction (1208 in FIG. 12) is returned to the operation client process 441.

In this embodiment, the above-described camera control commands include the following instructions.

Pan angle change instruction: PAN(θ)
Tilt angle change instruction: TIL(φ)
Zoom magnification change instruction: ZOM(α)

where (θ), (φ), and (α) are parameters representing the pan angle, tilt angle, and zoom magnification, respectively. The camera control commands can also include various commands such as back light correction and auto- and manual-focus value setting, though a detailed description thereof will be omitted.

The camera control server process 411 receives a camera control connection request from an arbitrary operation client process 441 or upload server process 431 executed in a similar manner and realizes camera control. However, the camera control server process 411 cannot be simultaneously connected to a plurality of operation client processes, as shown in FIG. 4. Hence, for this connection, connection-oriented communication of TCP/IP or the like is done.

While the camera state notification process 412 generated in step S602 is operating, the camera state is always checked. More specifically, as shown in FIG. 9, after the start of processing in step S620, initialization is performed in step S621, the camera/panhead control section 213 is inquired of the current camera state such as the pan and tilt angles and zoom magnification (=(p, t, and z)) of the camera, and the information of inquired camera state is formed into the packet 1209 shown in FIG. 12 and transmitted in step S623 to all operation client processes 441 to which an image is transmitted.

Figure 10A:
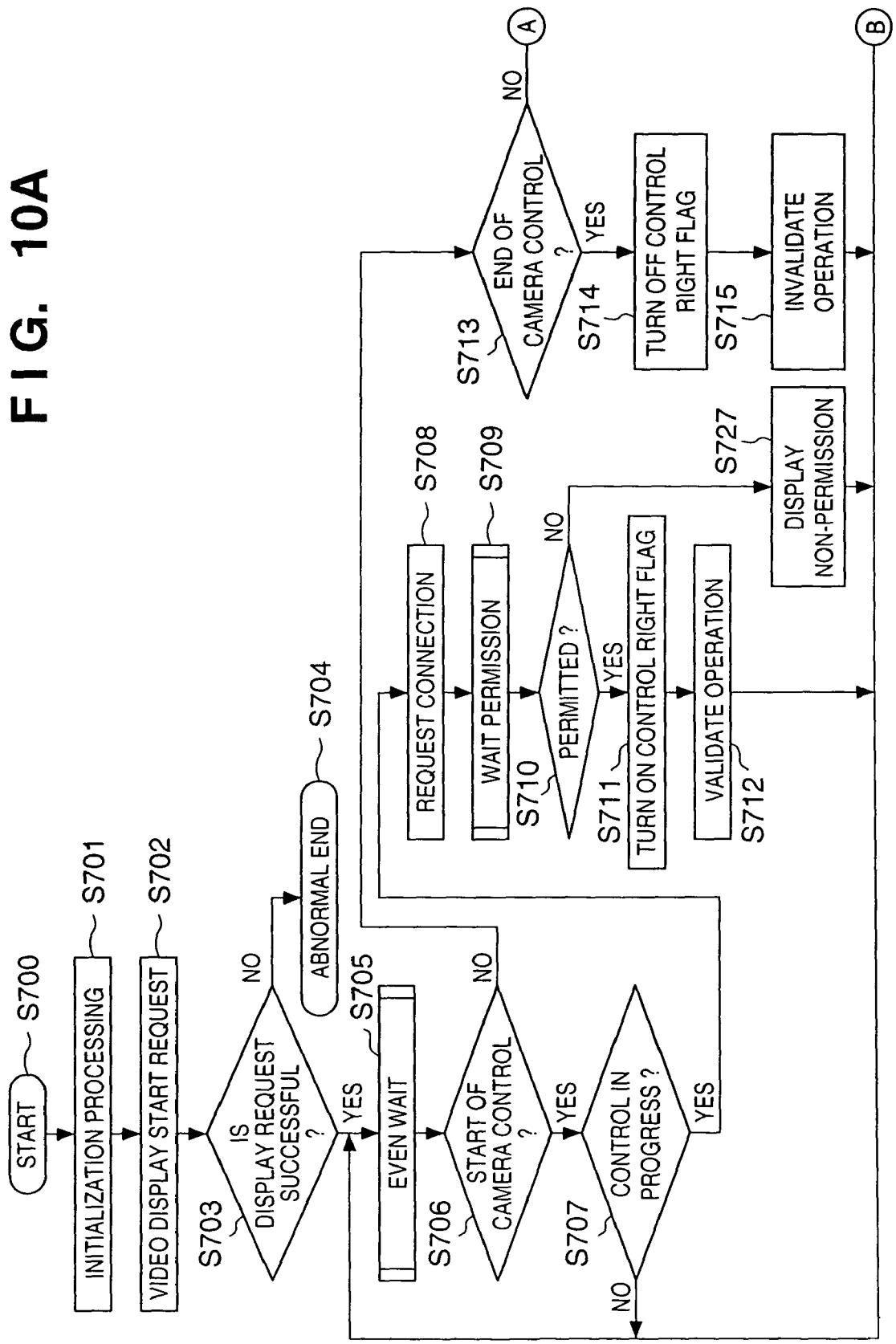
FIGS. 10A and 10B are flow charts showing details of operation of operation client process in the embodiment of the present invention.
Figure 10B:
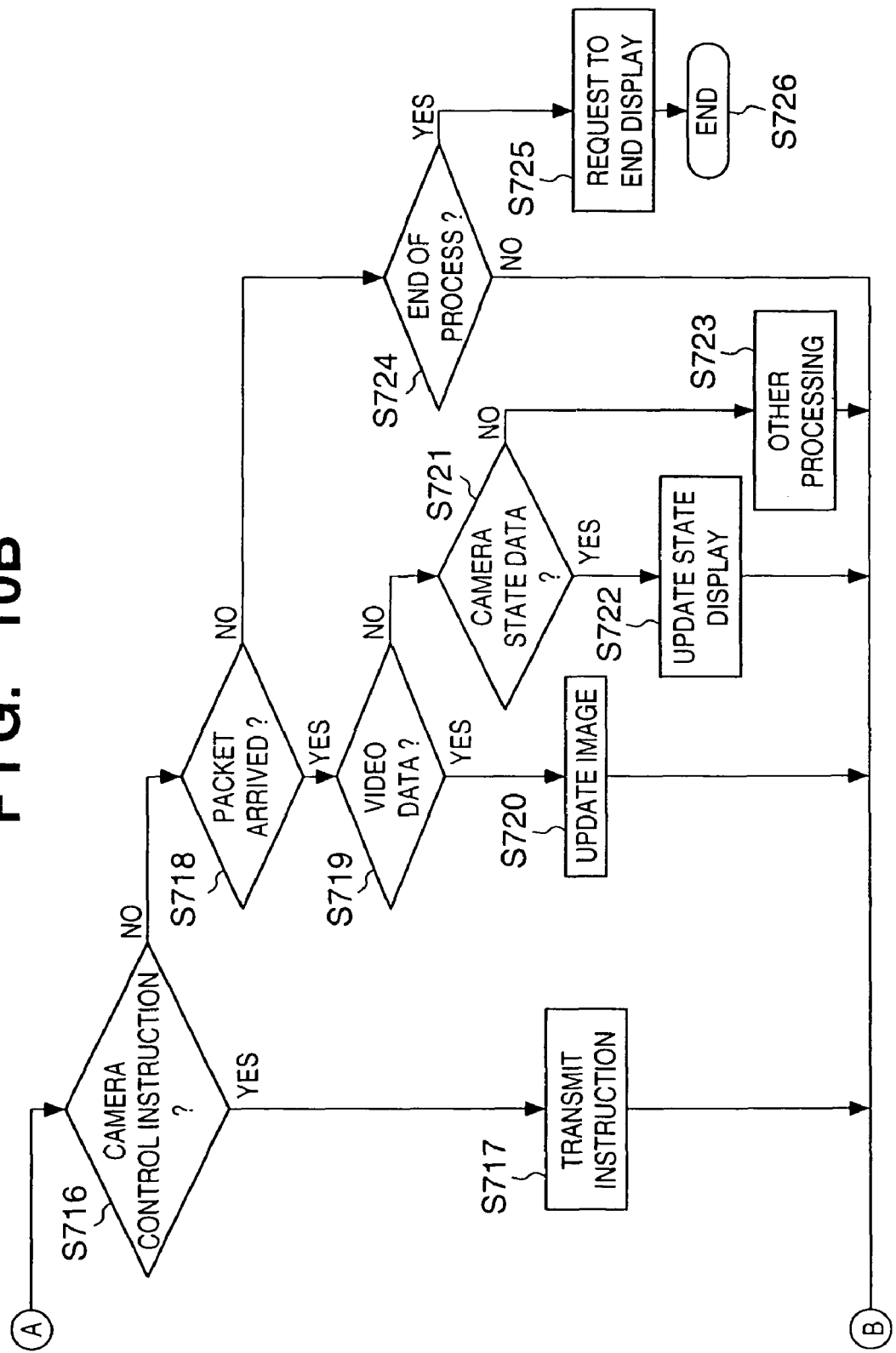

The operation of the operation client process 441 will be described next with reference to FIGS. 10A and 10B.

The process starts in step S700. When the process is activated while designating the address (e.g., IP address "ADDR_C") of the camera server apparatus 11 to be connected, initialization is performed in step S701, and then, the video display start request (1206 in FIG. 12) is transmitted to the camera server apparatus 11 at the address ADDR_C in step S702. The packet format 1206 shown in FIG. 12 is used.

If NO Ack is returned from the camera server apparatus 11 at ADDR_C (NO in step S703), it is an operation error because of, e.g., an incorrect address, and the flow advances to step S704 to end the operation client process 441. If Ack is returned, display is successful (YES in step S703), and the flow advances to step S705 to wait for events, i.e., inputs by user's operation on the user interface or various packets from the camera server apparatus 11.

When an event is input in step S705, the flow advances to step S706. When the input event is the ON state of the operation start button 1021 by user input, i.e., YES in step S706, it is confirmed in step S707 whether the client has already started camera control on the basis of a control right flag 442 shown in FIG. 4, which is stored in a storage section 329 of the client apparatus. If control has already been started, the flow returns to step S705. If control is not effected, the camera control connection request (1201 in FIG. 12) is issued to the camera control server process 411 in step S708, and permission (Ack) is waited in step S709. If Ack is returned (YES in step S710), control connection to the camera control server process 411 is established. The control right flag 442 is turned on in step S711, and operation from the camera control panel 102 is validated (step S712). As described above, Ack contains information related to the camera control start timing (control right acquisition timing) and control right acquisition time. The camera control server process 411 receives the connection request only when it is waiting for the camera control connection request in step S603 shown in FIG. 8. If no permission is obtained (NO in step S710), the user is warned of non-permission on the user interface of the client in step S727.

When control connection is established, and a predetermined time (control wait time) when the control right is valid has elapsed, a camera control connection end request (1208 in FIG. 12) is input from the camera control server process 411 as an event in step S705. In this case, YES in step S713, the control right flag 442 is turned off in step S714, and camera operation from the camera control panel 102 is invalidated (S715).

When the event input in step S705 is determined as a camera control instruction generated in accordance with operation of the camera control panel 102 while operation from the camera control panel 102 is valid (YES in step S716), an instruction (1203 to 1205 in FIG. 12) corresponding to the operation is issued to the camera control server process 411 in step S717. The instruction generation process has no direct relevance to the present invention, and a detailed description thereof will be omitted.

When the event input in step S705 is arrival of a packet (YES in step S718), the type of packet is checked. If it is video data (1210 in FIG. 12) (YES in step S719), compressed video data in the video data is read out and expanded, and then, the image displayed on the video display panel 101 is updated using this video frame data (step S720).

If the arriving packet is a camera state notification (1209 in FIG. 12) (YES in step S721), the notch positions of the scroll bars 1022, 1023, and 1028 for operating the pan and tilt angles and zoom magnification are changed to corresponding positions using parameters included in the packet in step S722. This means that the pieces of information are updated when another client process is controlling the camera 16.

For an end request for the operation client process 441, which is issued by menu operation or the like (YES in step S724), a video display end request (1207 in FIG. 12) is issued in step S725, and the operation client process 441 is ended (step S726).

Figure 11:
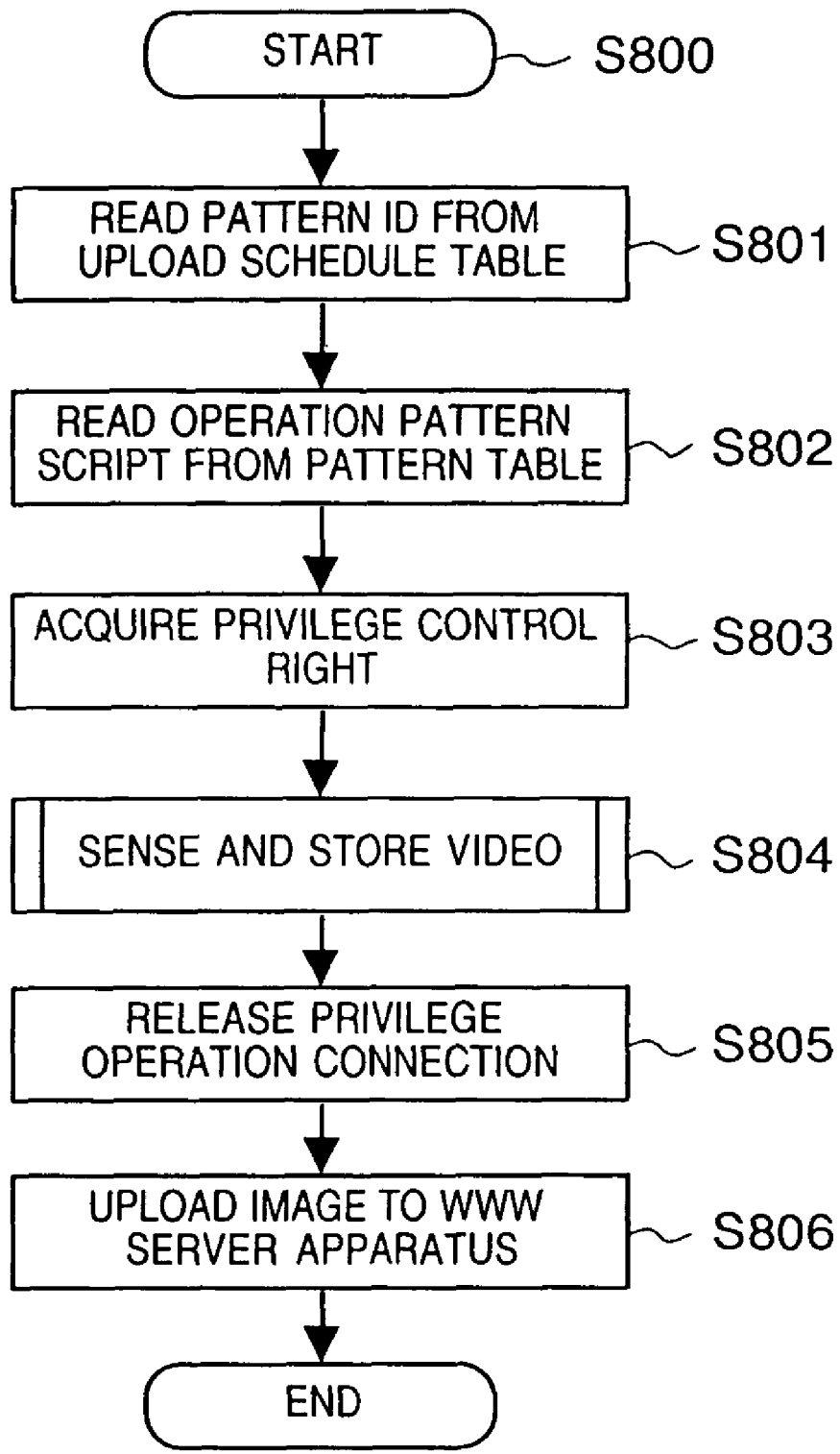
FIG. 11 is a flow chart showing details of operation of upload server process in the embodiment of the present invention.
Figure 16:
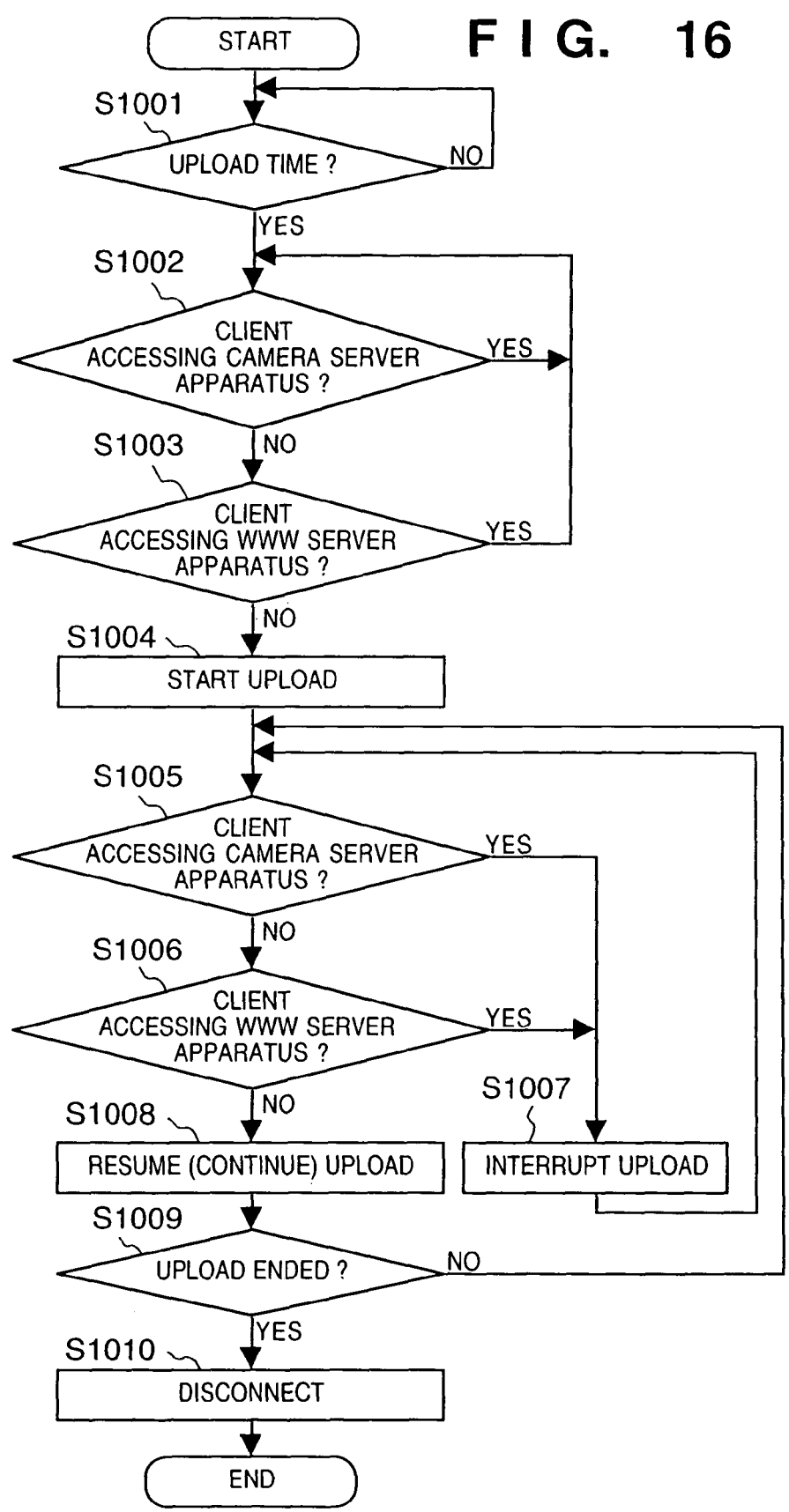
FIG. 16 is a flow chart showing details of upload process in the embodiment of the present invention.

The operation of the upload server process 431 will be described next with reference to FIGS. 11, 14A, 14B, and 16. FIG. 11 is a flow chart showing the operation of video storage and upload processing executed at a predetermined timing to be described later. FIG. 14A shows the upload schedule table, and FIG. 14B shows the pattern table. FIG. 16 is a flow chart showing image upload processing from the camera server apparatus 11 to the WWW server apparatus 12.

The upload schedule table is a table used to designate the timings of video storage start and end and a camera control pattern during video storage, and is set in the storage section 217 of the camera server apparatus 11. Each entry is formed from the video storage start timing of moving image data to be uploaded, at which video storage automatically starts, the end timing, the upload timing, the camera operation pattern script ID, and the storage video file name. A video sensed by the camera 16 from the video storage start timing to the end timing in the table shown in FIG. 14A is stored in a file designated with the storage video file name. During this time, the camera is controlled by operation according to a designated operation pattern. At the designated upload time, the video file is uploaded to the WWW server apparatus 12.

Operation patterns are stored in advance in the pattern table shown in FIG. 14B in the form of script to be described below. Each operation pattern is assigned an operation pattern script ID which is designated in the upload schedule table shown in FIG. 14A. The operation pattern script has a description "camera state 1", "wait time 1", "camera state 2", "wait time 2", "camera state 3", "wait time 3", . . . . The last symbol * means returning to the start of the script, so the operation is repeatedly performed. The camera state is represented by (pan angle, tilt angle, zoom magnification). The wait time is a wait time interval until a camera state N changes to the next camera state (N+1) and is represented by sec. For example, when the pattern ID of the pattern table is 1, the following operation is performed.

1) The (pan angle, tilt angle, zoom magnification) are set to (20°, 20°, ×1).
2) After 10 sec, (pan angle, tilt angle, zoom magnification) are set to (30°, 20°, ×2).
3) After 10 sec, (pan angle, tilt angle, zoom magnification) are set to (−20°, −20°, ×4)
4) After 20 sec, the settings are returned to 1), and the settings 1) to 4) are repeated subsequently.

In the upload server process 431, of the entries of this table, the entries of the video storage start timing, video storage end timing, and upload timing are set in the timer section 216, and at the video storage start timing, the flow shown in FIG. 11 is executed.

When processing starts in step S800, the pattern ID is read in from the upload schedule table.

In step S802, an operation pattern script corresponding to the pattern ID read in step S801 is read in from the pattern table.

After the operation pattern script is read in step S802, privilege control connection to the camera control server process 411 is forcibly established in step S803, as described above, and a camera operation pattern corresponding to the pattern ID read from the pattern table in the above way is executed in step S804. At the same time, a video storage start request command is sent to the video storage process 423 using, as an argument, the file name designated by the file name entry of the upload schedule table (with this command, YES is obtained in step S509 shown in FIG. 5, and processing shown in FIG. 6 is executed in step S510), and the write of the image in the designated file is started. At the storage end time, a camera control connection end request (1208 in FIG. 12) is issued to stop executing the camera operation pattern and release the privilege control connection (step S805). Simultaneously, a video storage end command is issued to the video storage process 423, and video storage in the file is ended.

At the upload time in the upload schedule table shown in FIG. 14A, the stored file is written to a predetermined area in the secondary storage device 463 of the WWW server apparatus 12 using the FTP (File Transfer Protocol) (step S806).

Detailed image data upload processing by the upload server process 431 in step S806 will be described below with reference to FIG. 16.

First, in step S1001, the upload schedule table shown in FIG. 14A is looked up to confirm whether it is the upload time for an image file stored in step S804.

At the upload time, the flow advances to step S1002 to confirm whether any operation terminal apparatus (client) 14 is accessing the camera server apparatus 11 as the image data upload source is present. If YES in step S1002, it is determined that the network is busy. Execution of image data upload is suspended until access from the operation terminal apparatus 14 to the camera server apparatus 11 is ended, thereby preventing any trouble in the operation terminal apparatus 14 accessing. When no operation terminal apparatus (client) 14 is accessing the camera server apparatus 11, the flow advances to step S1003.

In step S1003, the WWW server process 461 of the WWW server apparatus 12 is inquired whether any client 14 is accessing the WWW server apparatus 12. If the WWW server process replies that there is a client 14 accessing the WWW server apparatus 12, the flow returns to step S1002. It is determined that the network is busy, and execution of image data upload is suspended to prevent any trouble in the operation terminal apparatus 14 accessing. When no reply is received, it is determined that the network has some failure. When the WWW server process 461 replies that no client 14 is accessing the WWW server apparatus 12, the flow advances to step S1004 to start image data upload from the camera server apparatus 11 to the WWW server apparatus 12.

In step S1005, when the client 14 starts and is accessing the camera server apparatus 11, it is determined that the network is busy. The flow advances to step S1007 to interrupt image upload to the WWW server apparatus 12 to prevent any trouble in the client 14 accessing, and then returns to step S1005. On the other hand, when no client 14 is accessing the camera server apparatus 11, the flow advances to step S1006.

In step S1006, a notification from the WWW server process 461 of the WWW server apparatus 12 is waited. If a notification that a client 14 starts and is accessing the WWW server apparatus 12 is received, the flow advances to step S1007. It is determined that the network is busy, and image upload to the WWW server apparatus 12 is temporarily interrupted to prevent any trouble in the client 14 accessing. Then, the flow returns to step S1005. On the other hand, when no notification that any client 14 is accessing the WWW server apparatus 12 is received from the WWW server process 461, the flow advances to step S1008 to resume (continue) image data upload from the camera server apparatus 11 to the WWW server apparatus 12.

In step S1009, it is determined whether transfer of the image file to be uploaded is ended. If YES in step S1009, the flow advances to step S1010 to disconnect communication with the WWW server apparatus 12. If NO in step S1009, the flow returns to step S1005.

As described above, according to image upload processing by the upload server process 431 of this embodiment, when any client 14 is accessing the WWW server apparatus 12 or camera server apparatus 11, upload is temporarily interrupted to relax the busy state of the network. Hence, the influence on the client 14 due to congestion of the network is minimized.

In the processing shown in FIG. 16, when the client 14 accessing one of the WWW server apparatus 12 and camera server apparatus 11 is present, image data upload is interrupted. However, image data upload may be interrupted when the client/clients 14 are accessing both of the WWW server apparatus 12 and camera server apparatus 11.

In steps S1002, S1003, S1005, and S1006 in FIG. 16, it is determined whether any client is accessing the WWW server apparatus 12. However, the object of this embodiment is also attained even by processing of determining whether a predetermined number of clients are accessing.

In the WWW server apparatus 12, the FTP server process 462 is operating to receive the stored video file by the FTP. The WWW server process 461 is also operating to store the video file transferred by the FTP as a file in a file group described in the HTML such that the video file can be seen from another WWW browser through the network.

The upload schedule table and pattern table in the storage section 217 of the camera server apparatus 11 are set from the setting client process 451 operating on the server setting terminal apparatus 13 by connecting itself to the upload server process 431.

As has been described above, according to the present invention, at designated specific time, the camera is automatically operated in accordance with a designated camera control pattern, an image sensed by the camera is stored in a file as digital data, and the file is automatically transferred to the secondary storage device on the server connected to the network at a designated time. This eliminates trouble in the operation terminal accessing the camera and/or the WWW server apparatus when a video is transmitted in order to provide an image recorded in the past.

Other Embodiment

The object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

In a case where the present invention is applied to the aforesaid storage medium, the storage medium stores program codes corresponding to the flowcharts shown in FIGS. 4 to 11 described in the embodiment.

The present invention is not limited to the above embodiments and various changes and modifications can be made within the spirit and scope of the present invention. Therefore to apprise the public of the scope of the present invention, the following claims are made.

What is claimed is:

1. A data distribution method of distributing real-time image data from a camera server apparatus to clients via a network, comprising:
   storing the real-time image data in a memory;
   determining whether a number of clients to which the real-time image data are being distributed is less than a predetermined number;
   uploading the stored image data in the memory to a storage server apparatus which is different from the clients which requested the real-time image data when it is determined in the determining step that the number of clients to which the real-time image data are being distributed is less than the predetermined number; and interrupting uploading of the stored image data in the memory when it is determined that the number of clients to which the real-time image data are being distributed is not less than the predetermined number after it is determined that the number of clients to which the real-time image data are being distributed is less than the predetermined number.

2. The data distribution method according to claim 1, further comprising receiving, from the storage server apparatus, access situation of clients to the storage server apparatus, wherein the stored image data in the memory is uploaded when it is determined on the basis of the received access situation that no client is accessing to the storage server apparatus.

3. The data distribution method according to claim 1, wherein the determining step is performed at preset time, and the uploading step uploads at the preset time the stored image data which is captured during a preset period of time by a camera device directed to a preset direction if it is determined in the determining step that the number of clients to which real-time image data are being distributed is less than the predetermined number.

4. The data distribution method according to claim 1, wherein the predetermined number is one.

5. A data distribution method of distributing real-time image data from a camera server apparatus to clients via a network, comprising:
storing the real-time image data in a memory;
receiving access situation of clients to a storage server apparatus which is different from the clients which requested the real-time image data;
determining on the basis of the received access situation that whether a number of clients accessing to the storage server apparatus is less than a first predetermined number and whether a number of clients to which the real-time image data are being distributed is less than a second predetermined number; and
uploading the stored image data in the memory to the storage server apparatus which is different from the clients which requested the real-time image data when it is determined in the determining step that the number of clients accessing to the storage server apparatus is less than the first predetermined number and the number of clients to which the real-time image data are being distributed is less than the second predetermined number.

6. The data distribution method according to claim 5, wherein the receiving step is performed at preset time, and the uploading step uploads at the preset time the stored image data which is captured during a preset period of time by a camera device directed to a preset direction if it is determined in the determining step that the number of clients accessing to the storage server apparatus is less than the predetermined number.

7. The data distribution method according to claim 5, further comprising
interrupting uploading of the stored image data in the memory when it is determined that the number of clients accessing to the storage server apparatus is not less than the first predetermined number after it is determined that the number of clients accessing to the storage server apparatus is less than the first predetermined number.

8. A data distribution apparatus of distributing real-time image data from a camera server apparatus clients via a network, comprising:
a memory configured to store the real-time image data;
a determination unit configured to determine whether a number of clients to which the real-time image data are being distributed is less than a predetermined number;
an uploading unit configured to upload the stored image data in said memory to a storage server apparatus which is different from the clients which requested the real-time image data when the determination unit determines that the number of clients to which the real-time image data are being distributed is less than the predetermined number; and
an interruption unit configured to interrupt the uploading of the stored image data in the memory when it is determined that the number of clients to which the real-time image data are being distributed is not less than the predetermined number after it is determined that the number of clients to which the real-time image data are being distributed is less than the predetermined number.

9. The data distribution apparatus according to claim 8, further comprising a receiving unit configured to receive, from the storage server apparatus, access situation of clients to the storage server apparatus, wherein the stored image data in the memory is uploaded when it is determined on the basis of the received access situation that no client is accessing to the storage server apparatus.

10. The data distribution apparatus according to claim 8, wherein said determination unit performs the determination at preset time, and the uploading step uploads at the preset time the stored image data which is captured during a preset period of time by a camera device directed to a preset direction if it is determined by the determination unit that the number of clients to which real-time image data are being distributed is less than the predetermined number.

11. The data distribution apparatus according to claim 8, wherein the predetermined number is one.

12. A data distribution apparatus of distributing real-time image data from a camera server apparatus to clients via a network, comprising:
a memory configured to store the real-time image data;
a receiving unit configured to receive, from a storage server apparatus which is different from the clients which requested the real-time image data, access situation of clients to the storage server apparatus;
a determination unit configured to determine on the basis of the received access situation whether a number of clients accessing to the storage server apparatus is less than a first predetermined number and whether a number of clients to which the real-time image data are being distributed is less than a second predetermined number; and
an uploading unit configured to upload the stored image data in the memory to the storage server apparatus which is different from the clients which requested the real-time image data when it is determined by the determination unit that the number of clients accessing to the storage server apparatus is less than the first predetermined number and that the number of clients to which the real-time image data are being distributed is less than the second predetermined number.

13. The data distribution apparatus according to claim 12, wherein the receiving unit performs the reception of the access situation at preset time, and the uploading step uploads at the preset time the stored image data which is captured during a preset period of time by the camera device directed to a preset direction if it is determined by the determination unit that the number of clients accessing to the storage server apparatus is less than the predetermined number.

14. The data distribution apparatus according to claim 12, further comprising an interruption unit configured to interrupt the uploading of the stored image data in the memory when it is determined that the number of clients accessing to the storage server apparatus is not less than the first predetermined number after it is determined that the number of clients accessing to the storage server apparatus is less than the first predetermined number.

15. A non-transitory storage medium readable by a data processing apparatus, said storage medium storing a program which is executable by the data processing apparatus and comprises program codes realizing the data distribution method comprising:
- obtaining real-time image data;
- distributing the real-time image data to clients;
- storing the real-time image data in a memory;
- determining whether a number of clients to which the real-time image data are being distributed is less than a predetermined number;
- uploading the stored image data in the memory to a storage server apparatus which is different from the clients which requested the real-time image data when it is determined in the determining step that the number of clients to which the real-time image data are being distributed is less than the predetermined number; and
- interrupting uploading of the stored image data in the memory when it is determined that the number of clients to which the real-time image data are being distributed is not less than the predetermined number after it is determined that the number of clients to which the real-time image data are being distributed is less than the predetermined number.

16. A non-transitory storage medium readable by a data processing apparatus, said storage medium storing a program which is executable by the data processing apparatus and comprises program codes realizing the data distribution method comprising:
- obtaining real-time image data;
- distributing the real-time image data clients;
- storing the real-time image data in a memory;
- receiving access situation of clients to a storage server apparatus which is different from the clients which requested the real-time image data;
- determining on the basis of the received access situation whether a number of clients accessing to the storage server apparatus is less than a first predetermined number and whether a number of clients to which the real-time image data are being distributed is less than a second predetermined number; and
- uploading the stored image data in the memory to the storage server apparatus which is different from the clients which requested the real-time image data when it is determined in the determining step that the number of clients accessing to the storage server apparatus is less than the first predetermined number and the number of clients to which the real-time image data are being distributed is less than the second predetermined number.

* * * * *